UNITED STATES PATENT OFFICE.

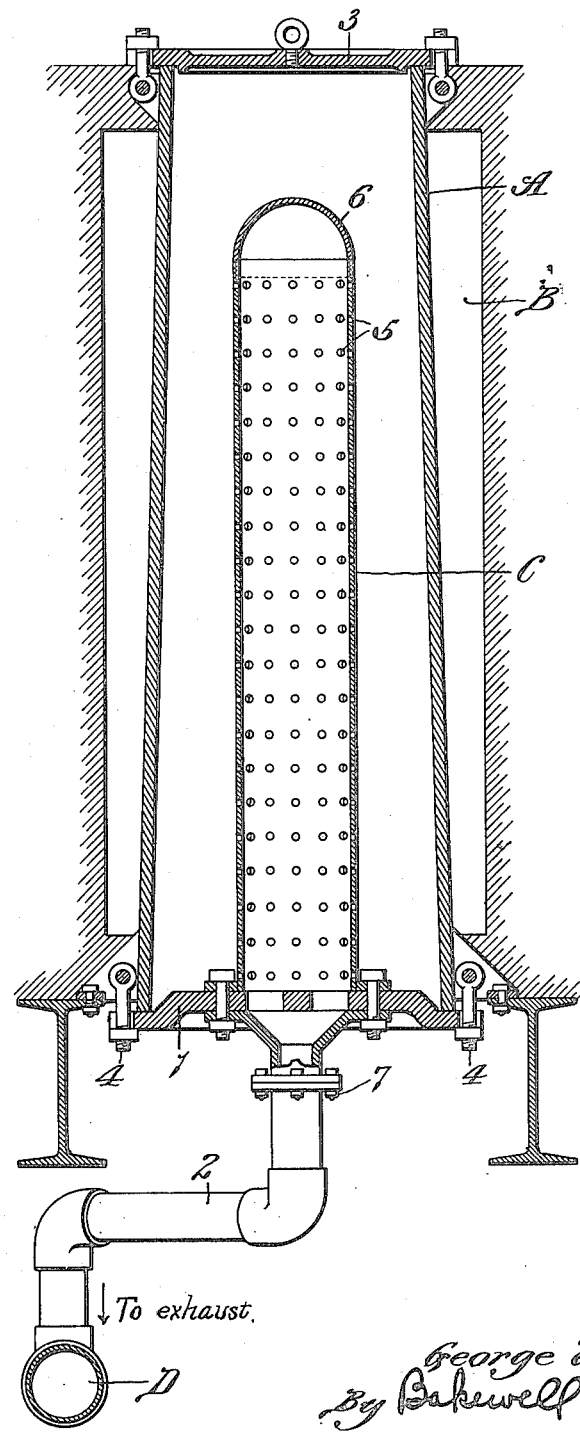

GEORGE W. WALLACE, OF EAST ST. LOUIS, ILLINOIS, ASSIGNOR, BY MESNE ASSIGNMENTS, TO WALLACE COKE, OIL AND BY-PRODUCTS COMPANY, OF EAST ST. LOUIS, ILLINOIS.

PROCESS FOR DISTILLING CARBONACEOUS MATERIALS.

1,283,001.     Specification of Letters Patent.    Patented Oct. 29, 1918.

Application filed March 26, 1918. Serial No. 224,785.

*To all whom it may concern:*

Be it known that I, GEORGE W. WALLACE, a citizen of the United States, residing at E. St. Louis, Illinois, have invented a certain new and useful Improvement in Processes for Distilling Carbonaceous Materials, of which the following is a full, clear, and exact description, such as will enable others skilled in the art to which it appertains to make and use the same.

This invention relates to the distillation or carbonization of carbonaceous materials.

The main object of my invention is to provide a practicable process for distilling, carbonizing or vaporizing carbonaceous materials that insures the removal and recovery of all of the hydrocarbon gases, vapors, liquids and oils evolved in the distilling operation.

Another object is to provide a distilling, carbonizing or vaporizing process that will produce relatively large amounts of oils and gases that are of great value, due to their improved quality and also high grade metallurgical coke of good density. Other objects and desirable features of my invention will be hereinafter pointed out.

Briefly described, my process consists in subjecting carbonaceous material to heat in a distilling chamber so as to liberate the gases and vapors, removing all of the evolved gases from said chamber in such a manner that the temperature of decomposition, namely, the temperature at which the hydrocarbons are distilled off, is the highest temperature to which the gases are subjected at any period of the distilling operation, collecting the oils and liquids evolved in the distilling operation and removing them from the distilling apparatus immediately before they have had an opportunity to become cracked or overheated, and at the completion of the distilling operation disassembling the distilling apparatus so as to discharge the coked residue and facilitate the cleaning of the orifices through which the gases, vapors and oils escape from the distilling chamber.

My process is applicable to the distillation, carbonization or vaporization of all coals, lignites, woods, oils, shales and carbonaceous substances, and while various kinds of apparatus can be used in practising my process, it is essential that an apparatus be used which is equipped with a heated distilling chamber, a perforated take-off duct constructed and arranged inside of the distilling chamber in such a manner that it eliminates the possibility of the evolved gases, vapors and oils contacting with the hot walls of said chamber or traveling through the coked material in said chamber in escaping therefrom and also insures the recovery and immediate removal from the distilling apparatus of all of the oils and liquids evolved in the distilling operation, and means for enabling the take-off duct and distilling chamber to be disassembled so as to effect the discharge of the coked residue and also facilitate the cleaning of the orifices in the take-off duct through which the evolved gases, vapors, oils and liquids escape from the distilling chamber. I am aware of the fact that processes have heretofore been devised for distilling carbonaceous materials which contemplated removing the gases and vapors from the distilling chamber through a perforated take-off duct arranged inside of the distilling chamber, but such processes have not proved successful and can not accomplish the same results as my process, owing to the fact that no provision is made for insuring all of the gases and vapors passing through the coolest zone in the distilling chamber in escaping therefrom, and no provision is made for collecting and immediately removing from the distilling apparatus the oils and liquids evolved in the distilling operation, the prior processes above referred to permitting some or all of the evolved oils and liquids to recondense in the apparatus, to become mixed with the coked residue and to vaporize again and again until it has become cracked into permanent gases and tars of inferior quality. In my improved process all of the gases, vapors and liquids have to travel through the coolest zone of the distilling chamber in escaping therefrom, and the oils and liquids evolved in the distilling operation are not only collected and prevented from mixing with the coked residue, but they are conducted out of a distilling apparatus as soon as they are formed. Furthermore, in my process the perforated take-off duct is withdrawn from the distilling chamber at the completion of the distilling operation and is then cleaned or replaced by another perforated take-off duct, thus eliminating delay and insuring successful results at the next distilling operation, due to the fact that there are no clogged orifices in the take-off duct to retard the escape of the gases, vapors and oils.

The figure of the drawings is a vertical sectional view of an apparatus that can be used in practising my process. The particular design or construction of said apparatus is immaterial, but it is essential that it comprise a retort or distilling chamber, preferably arranged vertically and sealed at its upper and lower ends, a perforated take-off duct arranged inside of said chamber, with its lower end in direct communication with an eduction pipe, thus insuring the collection and recovery at the same point of the gases, vapors, oils and liquids evolved during the distilling operation, and means for enabling said take-off duct and the bottom of the distilling chamber to be moved downwardly or the side wall portion of the distilling chamber to be moved upwardly with relation to the take-off duct and chamber bottom, so as to effect the discharge of the coked residue and also withdraw the take-off duct from the distilling chamber, and thus facilitate the cleaning of the take-off duct at the completion of the distilling operation. In the apparatus herein illustrated A designates a retort or distilling chamber, preferably of cylindrical shape in cross section that is adapted to contain carbonaceous material, said chamber being heated by any suitable means, such, for example, as products of combustion that are supplied to a combustion chamber B that surrounds the distilling chamber A. A perforated take-off duct C that is arranged at the center of the distilling chamber A has its lower end connected with an eduction pipe D, preferably a pipe in which a suction or partial vacuum is created. In the apparatus herein shown the take-off duct C and the bottom of the distilling chamber A are adapted to be moved downwardly at the completion of the distilling operation, so as to discharge the coked residue from the distilling chamber and also withdraw the take-off duct from the distilling chamber, so as to facilitate the cleaning of the take-off duct. Therefore, the bottom plate 1 of the distilling chamber is removable, the take-off duct C is mounted on said bottom plate, and the lower end of the take-off duct is connected with the eduction pipe D by means of a pipe 2 that can be disconnected from the lower end of the take-off duct and moved out of the path of the bottom plate 1 of the distilling chamber when it is desired to move said bottom plate downwardly. The cylindrical-shaped shell that constitutes the side wall of the distilling chamber A preferably tapers slightly from its lower toward its upper end and its upper end is sealed or cut off from the atmosphere by means of a removable cover 3 that is adapted to be opened, so as to permit the carbonaceous material to be introduced into the distilling chamber. The lower end of said distilling chamber is sealed or cut off from the atmosphere by the bottom plate 1, previously referred to, which is retained in position by bolts or other suitable fastening devices 4. The take-off duct C consists of a perforated member of cylindrical form that extends upwardly through the distilling chamber to a point in proximity to the upper end of said chamber, said take-off duct preferably being of uniform diameter throughout its entire length so that the annular space between the exterior of same and the side wall of the distilling chamber will diminish gradually in cross-sectional area from its lower toward its upper end, thereby causing the heat to penetrate through the material in the distilling chamber substantially uniformly, owing to the fact that the thickness of the body of material in the lower portion of said chamber where the heat is most intense is greater than the thickness of the body of material in the upper portion of said chamber where the temperature is lower. The take-off duct is provided with perforations 5 preferably arranged uniformly throughout the major portion of its length and of a size suitable for the particular carbonaceous material being distilled, said take-off duct being closed at its upper end by a dome-shaped portion 6 which is imperforate. It is not essential that the upper portion of the take-off duct be imperforate, but it is essential that sufficient carbonaceous material be in the distilling chamber to cover the orifices in the take-off duct.

When heat is applied to the walls of the heating chamber A all of the gases and vapors evolved from the carbonaceous material in said chamber are forced or drawn into the duct C through the perforations 5 therein, said gases and vapors traveling downwardly through the take-off duct to the eduction pipe D, and thence through said eduction pipe to a storage tank or to the place where they are to be consumed. As the take-off duct is arranged at the center of the distilling chamber at the coolest part of the body of carbonaceous material in said chamber, and as said take-off duct affords the only outlet for the gases and vapors, it will be evident that the gases and vapors, in escaping from the distilling chamber, pass through the coolest part of the material being distilled. In fact, from the moment the gases and vapors are evolved they follow a path, in escaping from the distilling chamber A, that will cause a reduction in the temperature of said gases and vapors below the initial temperature of formation, thus preventing any further breaking down of the hydrocarbon molecules. The above is also true of the oils and other liquids evolved in the distilling operation, and in view of the fact that the oils and liquids which enter the take-off duct C are collected in said duct and immediately removed from the apparatus through the suction pipe D, there is no possibility of the oils condensing, revaporizing or becoming cracked or mixed with the coked material surrounding the take-off duct, as would occur if the oils were permitted to collect and remain in the perforated take-off duct.

By removing the gases, vapors and oils from the distilling chamber in the manner above described and preventing the oils from mixing with the coked residue, a larger yield of hydrocarbon oils is obtained than is possible with any of the distilling processes heretofore in use, and as none of the oil vapors are allowed to come in contact with the heated walls of the distilling chamber or in contact with the hot coked material in proximity to said walls, it is evident that the oil which is obtained will be free from all of the less valuable unsaturated hydrocarbons that are produced at high temperatures, the oil having no free carbon or lamp black. It is also evident that the oil, by reason of the fact that it is not subjected to excessive and prolonged heat treatment, will contain all of the valuable hydrocarbon oils that are produced.

At the completion of the distilling operation the fastening devices 7 that detachably connect the pipe 2 to the lower end of the take-off duct C are removed and said pipe 2 is then moved laterally into an inoperative position, or, in other words, out of vertical alinement with the bottom plate 1 of the distilling chamber. Thereafter, said bottom plate 1 is moved downwardly so as to effect the discharge of the coked residue from the distilling chamber and also withdraw the take-off duct C from the distilling chamber. The orifices 5 in the take-off duct are then cleaned or a fresh take-off duct is arranged in operative position in the chamber A to be used in the next distilling operation. This feature of removing the take-off duct from the distilling chamber at the completion of the distilling operation is an essential characteristic of my process and is one of the things that makes my process practicable from a commercial standpoint, for I know, from practical experience, that in the operation of distilling coal the coal first softens and then becomes a pasty mass which spreads out in every direction, especially in the direction in which the gases and vapors flow in escaping from the distilling chamber, thereby causing the orifices in the take-off duct to become clogged or choked up each time a charge of carbonaceous material is distilled in the apparatus. By bodily removing the take-off duct from the distilling chamber in the manner above described I am able to clean same quickly and thoroughly or replace the take-off duct with a fresh take-off duct. Consequently, I overcome the necessity of taking the apparatus out of service for a considerable period and I also insure ample exit openings for the escape of the gases, vapors and oils from the distilling chamber during the distilling operation.

By removing the gases, vapors, oils and liquids from the distilling chamber in such a manner that all of the gases, vapors and oils have to flow from the hottest point to the coldest point in the distilling chamber, in escaping therefrom, I secure all of the advantages of low temperature distillation. In fact, I have the ideal conditions of low temperature distillation increased to their fullest possibility, in that none of the escaping gases, vapors and oils touch the heated walls of the distilling chamber, and further, that all of said gases, vapors and oils start to cool immediately after they have been formed. In my process the temperature of formation is the hottest or highest temperature to which any portion of the gases, vapors and oils are subjected, and thereafter, during the continuance of the process, the gases, vapors and oils gradually cool off, all of the above advantages being obtained without the necessity of carrying the temperature of the distilling chamber so low that the coke produced is of little or no value, on account of its lack of structure. In fact, with my process it is possible to carry a temperature high enough to produce a metallurgical coke and still have all of the advantages of low temperature distillation from the oil and gas yield standpoint. It is immaterial whether the gases, vapors and oils are forced out of the distilling chamber by the pressure created in said chamber or are drawn out of said chamber by a vacuum. I prefer, however, to remove the gases, vapors and oils from the distilling chamber by a vacuum that is varied according to the carbonaceous material used and regulated by the temperature used and by the oil and gas being produced. With the process above described it is possible to obtain from coal oils that are brown in color, greasy, not at all sticky and having none of the sticky, black, viscous characteristics of tar. Furthermore, when coal is distilled by the above process the oils that are obtained are high in tar acids and are free from naphthalene, free carbon and other objectionable substances.

Having thus described my invention, what I claim, and desire to secure by Letters Patent, is:

1. A process for distilling, carbonizing, or vaporizing solid carbonaceous materials, characterized by applying heat externally to a chamber in which solid carbonaceous material is arranged and protecting said material from the action of air, liquids or gases other than the gases and liquids evolved in the distilling operation, withdrawing under reduced pressure all of the evolved gases, vapors and liquids and causing them to travel through the coolest portion of the material in said chamber in escaping from the chamber, and collecting and immediately removing all of the oils and liquids evolved in the distilling operation.

2. A process for distilling, carbonizing, or vaporizing solid carbonaceous materials, characterized by arranging solid carbonaceous material in a chamber, heating the walls of said chamber and withdrawing under reduced pressure all of the evolved gases, vapors and liquids into a discharge passageway at the center of the mass of material in said chamber, and removing from said center passageway all of the evolved gases, vapors and liquids that enter same, the material in said chamber being protected, during the distilling operation, from the action of gases or oils other than those evolved from said material.

3. A process of distilling, carbonizing or vaporizing solid carbonaceous material, characterized by arranging solid carbonaceous material in a chamber that is sealed or cut off from the atmosphere and which is provided at its center with a vertically-disposed, perforated take-off duct that constitutes the sole outlet from said chamber during the distilling operation, applying heat externally to the wall of said chamber, thereby heating the material therein and withdrawing under reduced pressure all of the evolved gases, vapors and liquids into said take-off duct, and causing all of the gases, vapors and liquids that enter said take-off duct to flow downwardly through same and immediately escape from said take-off duct.

GEORGE W. WALLACE.